United States Patent
Hochmuth (10) Patent No.: US 9,213,655 B2
(45) Date of Patent: Dec. 15, 2015

(54) COMPUTING DEVICE TO CONNECT TO A PORTABLE DEVICE

(71) Applicant: HEWLETT-PACKARD DEVELOPMENT COMPANY, L.P., Houston, TX (US)

(72) Inventor: Roland M. Hochmuth, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/744,191

(22) Filed: Jun. 19, 2015

(65) Prior Publication Data
US 2015/0286588 A1 Oct. 8, 2015

Related U.S. Application Data

(63) Continuation of application No. 13/982,197, filed as application No. PCT/US2011/022740 on Jan. 27, 2011, now Pat. No. 9,092,242.

(51) Int. Cl.
G06F 13/38 (2006.01)
G06F 13/10 (2006.01)
G06F 9/445 (2006.01)
G06F 9/455 (2006.01)
G06F 3/00 (2006.01)

(52) U.S. Cl.
CPC .............. *G06F 13/105* (2013.01); *G06F 9/445* (2013.01); *G06F 9/455* (2013.01)

(58) Field of Classification Search
None
See application file for complete search history.

(56) References Cited

U.S. PATENT DOCUMENTS

| 6,530,081 B1 | 3/2003 | Hayes, Jr. |
| 7,076,633 B2 | 7/2006 | Tormasov et al. |
| 7,707,563 B2 | 4/2010 | Wei |
| 2004/0199574 A1 | 10/2004 | Franco et al. |
| 2006/0259592 A1 | 11/2006 | Angeline |
| 2007/0198339 A1 | 8/2007 | Shen et al. |
| 2008/0109396 A1 | 5/2008 | Kacin |
| 2008/0126511 A1 | 5/2008 | Appaji |

(Continued)

FOREIGN PATENT DOCUMENTS

WO WO-02/18333 A1 1/2002

OTHER PUBLICATIONS

Hardy, "Palm Pre and Webos Preview", < http://www.brighthand.com/default.asp?newsID=14785&review=Palm+Pre+webOS+Preview > Publication Date: Nov. 1, 2009 (6 pages).

(Continued)

*Primary Examiner* — Scott Sun
(74) *Attorney, Agent, or Firm* — Hewlett-Packard Patent Department (57) ABSTRACT

A computing device receives, from a portable device, an application that is executable on the portable device. The computing device determines whether the received application is a static application or an interpreted application. In response to determining that the received application is a static application, the computing device executes the received application using a hardware virtualizer. In response to determining that the received application is an interpreted application, the computing device executes the received application using a dynamic translator.

19 Claims, 5 Drawing Sheets

(56) References Cited

U.S. PATENT DOCUMENTS

| | | | |
|---|---|---|---|
| 2009/0036111 A1* | 2/2009 | Danford | H04L 41/0893 455/419 |
| 2009/0063178 A1 | 3/2009 | Pousti et al. | |
| 2009/0281991 A1 | 11/2009 | Huynh et al. | |
| 2010/0153948 A1 | 6/2010 | Schreiber et al. | |

OTHER PUBLICATIONS

International Searching Authority, International Search Report and Written Opinion, Appln No. PCT/US2011/022740, date of mailing Oct. 25, 2011 (10 pages).

* cited by examiner

COMPUTING DEVICE TO CONNECT TO A PORTABLE DEVICE

CROSS-REFERENCE TO RELATED APPLICATION

This is a continuation of U.S. application Ser. No. 13/982,197, filed Jul. 26, 2013, which is a national stage application under 35 U.S.C. §371 of PCT/US2011/022740, filed Jan. 27, 2011, both hereby incorporated by reference.

BACKGROUND

A smart phone or personal digital assistant may have components optimized to save battery power such as the display and processor. A smart phone or personal digital assistant can include applications that are formatted for the hardware of the smart phone or personal digital assistant. An application formatted for the hardware of the smart phone or personal digital assistant may not execute on a computer such as a desktop or notebook.

BRIEF DESCRIPTION OF THE DRAWINGS

Some embodiments of the invention are described with respect to the following figures.

DETAILED DESCRIPTION

Portable devices use hardware and software that are designed for portability. A portable device is one that can be moved easily and can fall into multiple categories such as notebook, ultralight and handheld. The portable device can have batteries or another portable power source and can have hardware such as processors and displays that use less power than a non-portable counterpart to prolong the battery life of the portable device before requiring a recharge.

Portable devices can have applications that can be downloaded or purchased. The applications such as games, productivity, and media applications can be used on the portable device, but cannot be easily accessed by a computing device such as a desktop computer. A user may not want to purchase different software to run on a desktop computer if the software that they want to access is on their portable device.

If a portable device advertised itself to a computing device, then the computing device could display a list of applications that are on the portable device. For example if the portable device and the computing device were on the same 802.11 (Wi-Fi) network the portable device can advertise to the computing device that it is there. The computing device can determine a list of applications that are on the portable device and present an application in a graphical user interface (GUI) such as a menu or folder. The user can then access an application from the GUI which can cause the computing device to execute the application from the portable device using a hardware virtualizer that emulates the hardware of the portable device. By executing the application on the computing device from the portable device the user may have available a larger screen, more processing speed, more memory or other capabilities than are not on the portable device.

In one embodiment, a computing device includes a transceiver to establish a connection to a portable device. The computing device includes a controller that can receive an advertisement from the portable device through the transceiver if the portable device is connected. The controller also can request a list from the portable device. The computing device can include a memory to store a list, received from the portable device through the transceiver, of an application formatted for the hardware of the portable device. A graphical user interface can present the list of the application to the user of the computing device. A hardware virtualizer on the computing device can execute the application on the computing device.

One embodiment is a method of automatically presenting an application including a portable device that advertises itself. The portable device can be discovered with a computing device paired with the portable device. A computing device can establish a connection with the portable device. The computing device can determine an application that is available on the portable device. The computing device can present the application on the portable device in a list with a native computing device application.

Figure 1:
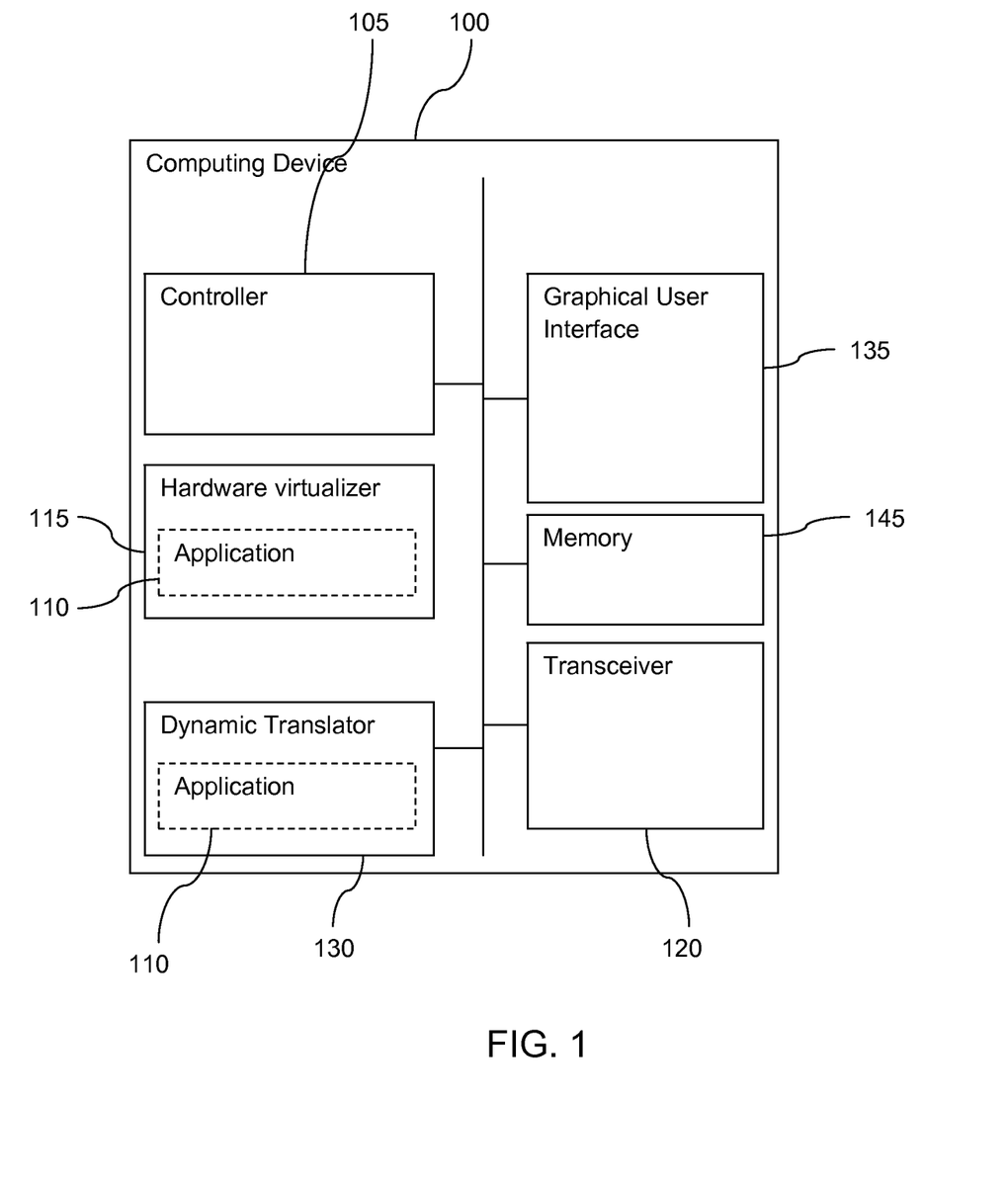
FIG. 1 is a block diagram of a device according to an example embodiment of the invention.

With reference to the figures, FIG. 1 is a block diagram of a device according to an example embodiment of the invention. A computing device 100 can include a transceiver 120 to establish a connection to a portable device. The computing device 100 can be for example a desktop computer, a notebook computer, a tablet computer or another computing device. The transceiver 120 can be for example a wireless transceiver such as Bluetooth or WLAN such as 802.11. The transceiver may also be a wired connection such as USB, IEEE 1392, eSATA or another connection. If the transceiver 120 is a wireless transceiver then the computing device 100 may be paired with the portable device. Pairing can be the creation of a persistent link between the computing device and the portable device, which may involve the exchange of a passkey between two devices. Pairing may occur once so future connections between the devices are authenticated automatically.

The computing device 100 can include a controller 105 to receive an advertisement from the portable device through the transceiver 120 if the portable device is connected through a wired connection or paired with the computing device 100. The advertisement may be done by a service discovery protocol such as Zeroconf, that locates devices such as other computers, and the services that those devices offer on a local network using multicast Domain Name System service records. The controller 105 may be a network controller, a central processing unit or another circuit to process instructions or data.

The controller 105 can send a request to the transceiver 120. If the transceiver is connected to a portable device then the request can cause the portable device to send a list that includes at least one application or service that are stored on the portable device. The list of that application or service can be stored in a memory 145. The memory may be a volatile or non-volatile memory, for example the memory may be random access memory (RAM), Flash memory, a hard disk drive, an optical storage or another type of memory.

The application may be interpreted or static. A static application is translated into machine code before execution. For example applications written in C or C++ are static and HTML are interpreted. If the application from the portable device is static the machine code may not be executed properly on the computing device hardware and the hardware virtualizer 115 is used to execute the machine code of the static application. If the application is interpreted then it may be executed with a dynamic translator 130 such as a just-in-time (JIT) compiler on the computing device 100. The JIT compiler can translate the application to machine readable code continuously.

The list of that application received from the portable device through the transceiver 120 can be of an application formatted for the hardware of the portable device and stored on the portable device. The computing device may include a controller for example that uses a first instruction set such as X86 while the application may be formatted to execute on a controller that uses a second instruction set such as ARM. A hardware virtualizer 115 may be used to create a virtual controller with the second instruction set that executes on the controller with the first instruction set. The hardware virtualizer may be hardware or software.

A graphical user interface (GUI) 135 can present the list of the application. The list may be presented to a user on a display. For example the list may include links, icons, menu items and may be presented in a folder, a task bar, on the desktop of a GUI or in other forms.

If the user activates displayed presentation of the application on the list the computing device can receive the application 110 from the portable device through the transceiver 120. The application can then be executed by the hardware virtualizer 115 or the dynamic translator 130. The user may then see the application on the GUI 135 of the computing device 100.

Figure 2:
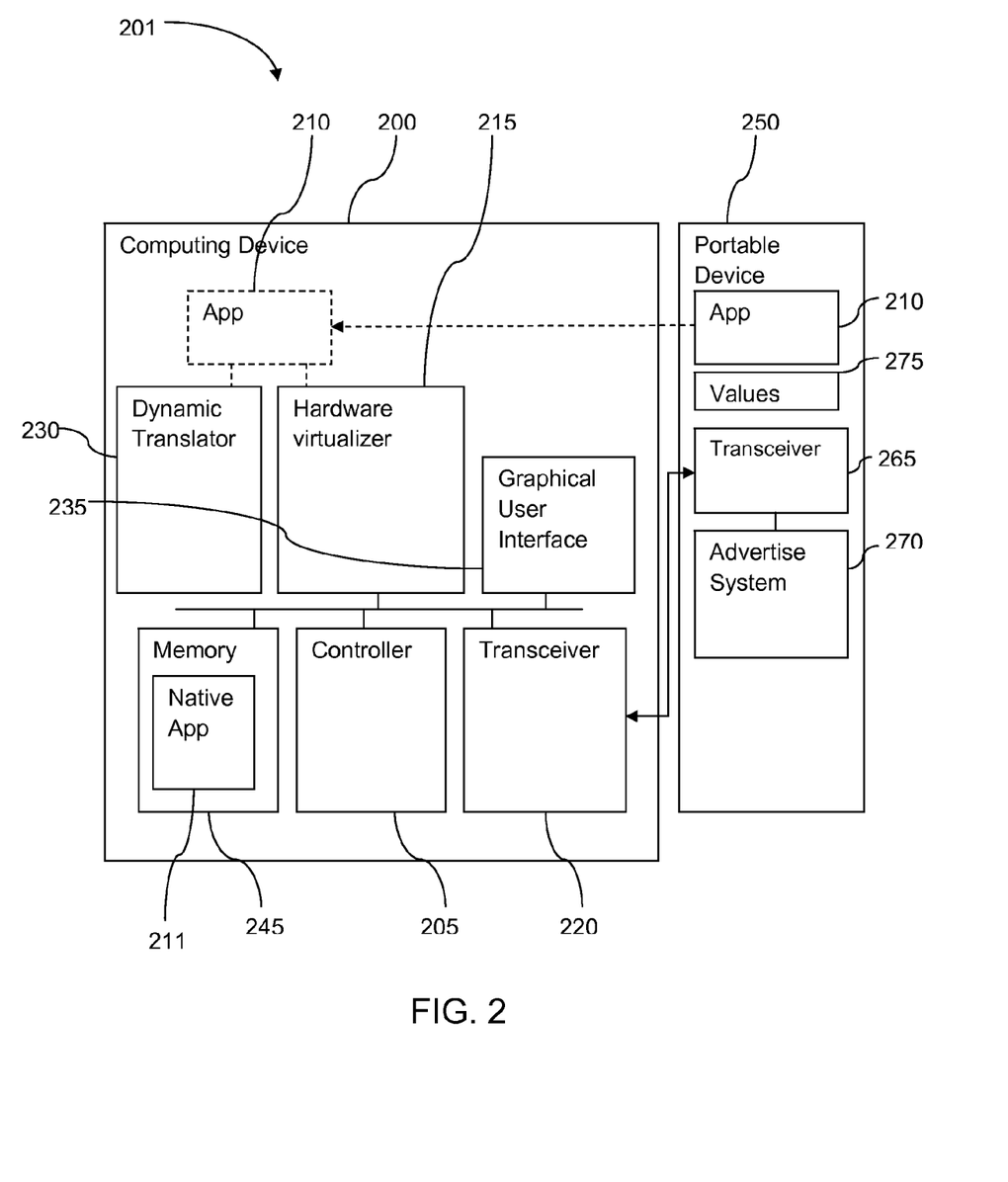
FIG. 2 is a block diagram of a system according to an example embodiment of the invention.

FIG. 2 is a block diagram of a system according to an example embodiment of the invention. The system 201 includes a computing device 200 and a portable device 250. The portable device 250 can be a device that can be moved easily and can fall into multiple categories such as notebook, ultralight and handheld. The portable device 250 can have batteries and can have hardware such as processors or displays that use less power than a non-portable counterpart to prolong the battery life of the portable device before requiring a recharge.

The portable device 250 can include an application 210 stored on the portable device 250. The application can be formatted to execute on the hardware of the portable device 250. The hardware may be different than the hardware of the computing device 200. The computing device 200 may have a native application 211 that is designed to execute on the hardware of the computing device 200. For example the computing device may have an operating system designed to execute on the computing device 200. The native application 211 may also be for example a word processor, spreadsheet or web browser or another application. The hardware virtualizer 215 may be run by the operating system if the application that is trying to be executed is not a native app to the hardware or operating system of the computing device 200 and is not an application that can be interpreted by a dynamic translator 230.

The portable device 250 may include a transceiver 265 to communicate data to the transceiver 220 of the computing device 200. The transceiver 265 can send an advertisement from the advertise system 270 of the portable device to the computing device 200. The advertisement can be received and/or discovered by the computing device 200 and processed by the controller 205. The computing device 200 and the portable device 250 may automatically create a connection that allows data to be sent between the computing device 200 and the portable device 250. The automatic creation of the connection can be by a service discovery protocol. The connection can allow the computing device 250 to request from the portable device values 275. The values 275 may be for example the name, description or an icon of an application on the portable device.

The values may be stored in the memory 245 of the computing device. The controller 265 can access the values 275 from the memory and display the values on the graphical user interface (GUI) 235. The GUI may present in a menu that the values from the portable device 250. The values may be links that if activated cause the application 210 to be retrieved from the portable device 250 and executed on the hardware virtualizer 215 of the computing device 200.

In one embodiment a menu presented by the graphical user interface may include a value for the application 210 and a link or value for a second application that is a native application 211 to the computing device. The menu may be presented as a folder that includes many values.

Figure 3:
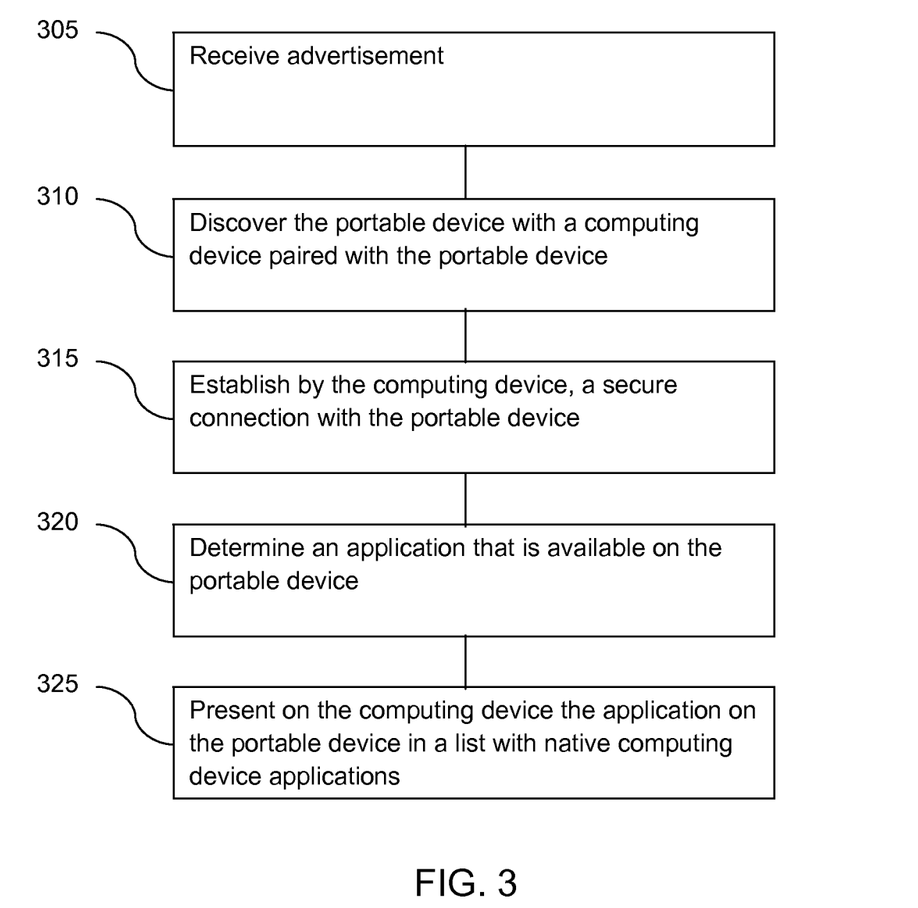
FIG. 3 is a flow diagram of a method according to an example embodiment of the invention.

FIG. 3 is a flow diagram of a method according to an example embodiment of the invention. The method can be for automatically presenting an application. The method can begin at 305 by receiving an advertisement from a portable device. Advertising can be by a service discovery protocol. A portable device that is connected by a wire or paired with the computing device can discover at 310 the portable device from the advertisement.

The computing device can establish a connection with the portable device at 315. The connection can be established automatically and allow the transfer of data between the computing device and the portable device.

The computing device can determine an application that is available on the portable device at 320. The determination may be from a request sent to the portable device from the computing device and the computing device may then receive from the portable device a list or values of an application that is available on the portable device. The value may be for example a name, description or an icon that is associated with the application on the portable device.

The computing device may present the application on the portable device in a list at 325. The list may include a native computing device application. The presentation can be done in a graphical user interface (GUI) such as a menu, folder, window or another GUI.

Figure 4:
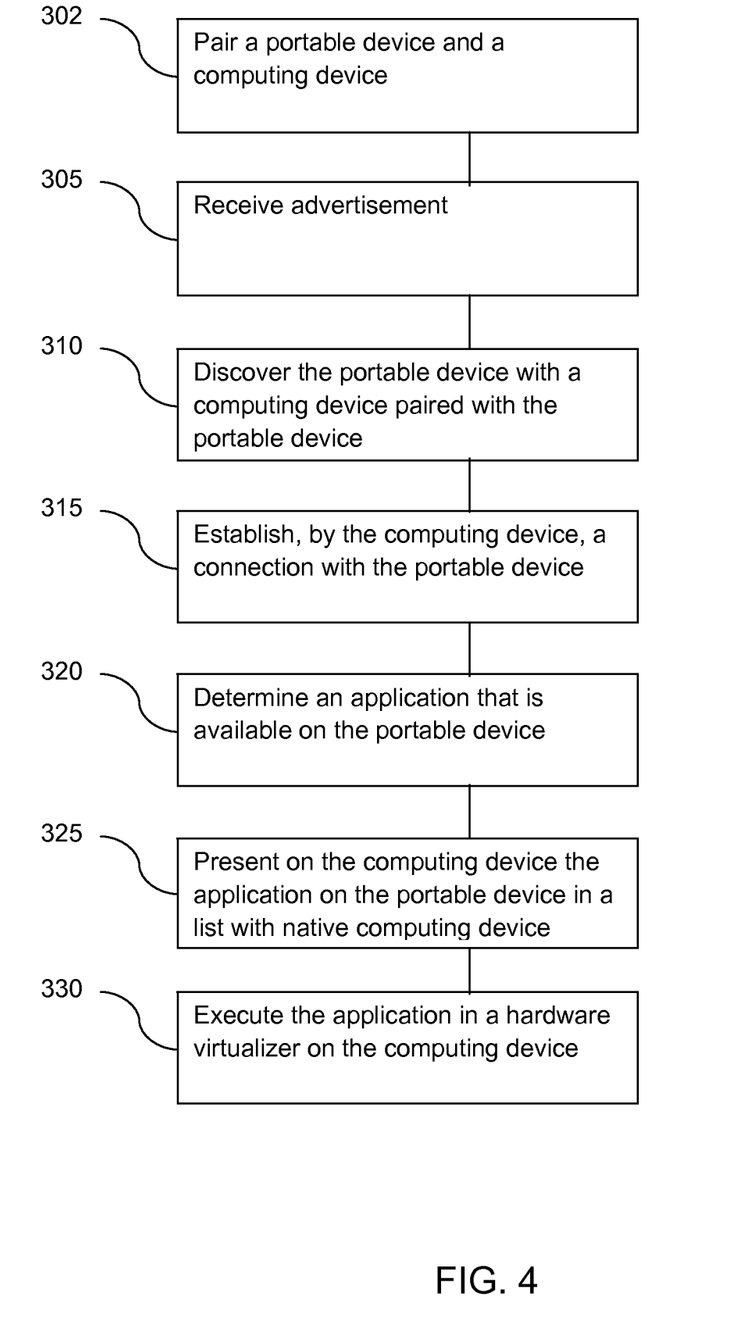
FIG. 4 is a flow diagram of a method according to an example embodiment of the invention.

FIG. 4 is a flow diagram of a method according to an example embodiment of the invention. The method can be for automatically presenting an application. The method can begin at 302 by pairing a portable device and computing device. If a portable device is paired with a computing device they can connect to each other automatically when they are on the same network or in range. For example if the portable device and the computing device are paired by Bluetooth they will automatically connect when they are in range of each other or if they are paired by WLAN then they may connect via an adhoc network if they are in range of each other or through an access point if they are both in range of an access point on the network. If the portable device and the computing device are paired then the portable device can advertise to the computing device. Advertising can be by a service discovery protocol. A portable device that is connected by a wire or paired with the computing device can discover at 310 the portable device from the advertisement.

The computing device can establish a connection with the portable device at 315. The connection can be established automatically and allow the transfer of data between the computing device and the portable device.

The computing device can determine an application that is available on the portable device at 320. The determination may be from a request sent to the portable device from the computing device and the computing device may then receive from the portable device a list or values of an application that is available on the portable device. The value may be for example a name, description or an icon that is associated with the application on the portable device.

The computing device may present the application on the portable device in a list at 325. The list may include a native computing device application. The presentation can be done in a graphical user interface (GUI) such as a menu, folder, window or another GUI. The computing device can execute the application in a hardware virtualizer on the computing device.

Any of Pairing at 302, advertising at 305, discovering at 310, establishing 315, determining at 320, present at 325 or executing at 330 can be performed automatically, for example without user input, if the computer device discovers the portable device. In one embodiment the connection between the portable device and the computing device is a secure connection. The secure connection prevents tampering with the applications and prevents access to information on the portable device from devices except the computing device. In one embodiment the portable device authenticates a user profile and the computing device authenticates a user profile to make the connection. The authentication of the user profile may be used to create the secure connection.

Figure 5:
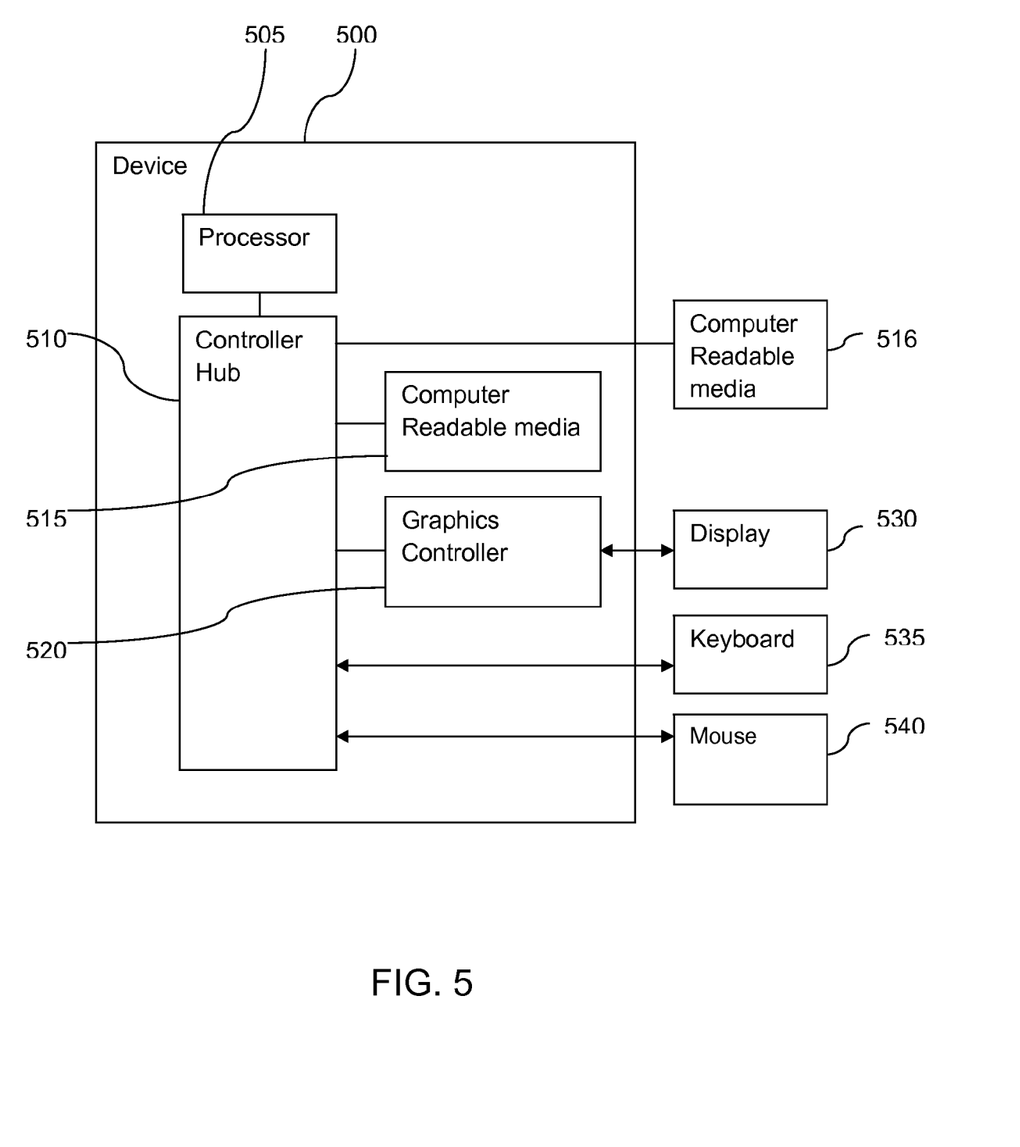
FIG. 5 is a block diagram of a device according to an example embodiment of the invention.

FIG. 5 is a block diagram of a device according to an example embodiment of the invention. The device 500 can include a processor 505, a controller hub 510 connected to the processor. The controller hub 510 may be in the same package as the processor 505, may be on the same substrate as the processor 505 or in a separate package from the Processor 505. The controller hub 510 can connect to a graphic controller 520.

A display 530 can be connected to the graphics controller 520. The display 430 can display a graphical user interface. The graphic controller 520 can generate the signals that are received by the display and generate the graphics on the display. The controller hub 510 may connect to input devices. For example a keyboard 535 or a mouse 540 can be connected to the controller hub 510.

The controller hub may be connected to a computer readable media 515 or 516. The computer readable media 515 or 516 can include code that if executed may cause the processor 505 of a computing device 500 to discover a portable device paired with the computing device. The code may cause computing device 500 to automatically authenticate the portable device. The code may cause computing device 500 to establish a secure connection to the portable device. The code may cause computing device 500 to determine an application available on the portable device. The code may cause computing device 500 to execute the application in a hardware virtualizer on the computing device.

The code may generate a list that is presented on the display 530 by the graphics controller 520 or may authenticate the portable device using a user profile on the computing device and the portable device.

The techniques described above may be embodied in a computer-readable medium for configuring a computing device to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store and/or transmit the software modules discussed herein. Computing devices may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
receiving, by a computing device from a portable device comprising a processor and a display, an application that is executable on the portable device;
determining, by the computing device, whether the received application is a static application or an interpreted application;
in response to determining that the received application is a static application, executing, by the computing device, the received application using a hardware virtualizer; and
in response to determining that the received application is an interpreted application, executing, by the computing device, the received application using a dynamic translator.

2. The method of claim 1, wherein the received application is executed in the computing device that comprises a processor and a display.

3. The method of claim 1, wherein the received application is executed in the computing device selected from among a desktop computer, a notebook computer, or a tablet computer.

4. The method of claim 1, wherein executing the received application using the hardware virtualizer comprises executing the received application using the hardware virtualizer that emulates hardware of the portable device.

5. The method of claim 1, wherein executing the received application using the dynamic translator comprises executing the received application using the dynamic translator that translates the received application to machine readable code.

6. The method of claim 1, wherein executing the received application using the dynamic translator comprises executing the received application using a compiler that translates the received application to machine readable code continuously.

7. The method of claim 1, wherein receiving the application comprises receiving the application purchased for the portable device, and wherein executing the received application using the hardware virtualizer or the dynamic translator is performed without having to purchase the received application for the computing device.

8. The method of claim 1, wherein the received application is included in a plurality of applications executable by the portable device, the method further comprising:
receiving, by the computing device, a list of the plurality of applications from the portable device;
presenting, by the computing device, the list of the plurality of applications in a display of the computing device;

receiving, by the computing device, user selection from the list of a selected application of the plurality of applications, wherein the received application is the selected application.

9. The method of claim 1, further comprising:
discovering, by the computing device, the portable device in response to an advertisement from the portable device; and
establishing, by the computing device in response to the discovering, a connection with the portable device.

10. A non-transitory computer-readable storage medium storing instructions that upon execution cause a computing device to:
receive, from a portable device comprising a processor and a display, an application that is executable on the portable device;
determine whether the received application is a static application or an interpreted application;
in response to determining that the received application is a static application, execute the received application using a hardware virtualizer; and
in response to determining that the received application is an interpreted application, execute the received application using a dynamic translator in lieu of using the hardware virtualizer.

11. The non-transitory computer-readable storage medium of claim 10, wherein the received application is executed in the computing device that comprises a processor and a display.

12. The non-transitory computer-readable storage medium of claim 10, wherein the received application is executed in the computing device selected from among a desktop computer, a notebook computer, or a tablet computer.

13. The non-transitory computer-readable storage medium of claim 10, wherein executing the received application using the hardware virtualizer comprises executing the received application using the hardware virtualizer that emulates hardware of the portable device.

14. The non-transitory computer-readable storage medium of claim 10, wherein executing the received application using the dynamic translator comprises executing the received application using the dynamic translator that translates the received application to machine readable code.

15. The non-transitory computer-readable storage medium of claim 10, wherein executing the received application using the dynamic translator comprises executing the received application using a compiler that translates the received application to machine readable code continuously.

16. The non-transitory computer-readable storage medium of claim 10, wherein the instructions upon execution causing the computing device to further:
discover the portable device in response to an advertisement from the portable device; and
establish, in response to the discovering, a connection with the portable device.

17. A computing device comprising:
a hardware virtualizer to emulate hardware of a portable device;
a dynamic translator to translate an application to machine readable code;
a processor; and
a display,
the processor to:
receive, from the portable device comprising a processor and a display, an application that is executable on the portable device;
determine whether the received application is a static application or an interpreted application;
in response to determining that the received application is a static application, execute the received application using the hardware virtualizer; and
in response to determining that the received application is an interpreted application, execute the received application using the dynamic translator.

18. The computing device of claim 17, wherein the received application is included in a plurality of applications executable by the portable device, the processor of the computing device to further:
receive a list of the plurality of applications from the portable device;
present the list of the plurality of applications in the display of the computing device; and
receive user selection from the list of a selected application of the plurality of applications, wherein the received application is the selected application.

19. The computing device of claim 17, wherein the processor is to further:
discover the portable device in response to an advertisement from the portable device; and
establish, in response to the discovering, a connection with the portable device.

* * * * *